United States Patent [19]

Hegglin et al.

[11] Patent Number: 5,669,413
[45] Date of Patent: Sep. 23, 1997

[54] CONTROL VALVE HAVING AN ACTUATING DRIVE AND METHOD THEREFOR

[75] Inventors: Andreas Hegglin, Reutlingen; Giuseppe Pulli, Stäfa; Manuel Brühlmann, Zürich, all of Switzerland

[73] Assignee: Staefa Control System SCS AG, Switzerland

[21] Appl. No.: 636,680

[22] Filed: Apr. 23, 1996

Related U.S. Application Data

[63] Continuation of Ser. No. 346,691, Nov. 30, 1994, abandoned.

[30] Foreign Application Priority Data

Jun. 21, 1994 [CH] Switzerland .................. 01961/94

[51] Int. Cl.⁶ .................................................. F16K 31/40
[52] U.S. Cl. ................................. 137/554; 137/630.15
[58] Field of Search ................. 137/630.15, 630.14, 137/554; 251/129.04, 30.04

[56] References Cited

U.S. PATENT DOCUMENTS

| | | | |
|---|---|---|---|
| 2,345,306 | 3/1944 | Van Der Werff | 137/630.13 X |
| 3,213,887 | 10/1965 | Angelery | 137/630.15 |
| 3,447,568 | 6/1969 | Burkart | 137/630.13 |
| 3,752,189 | 8/1973 | Marr | 251/129.04 X |
| 3,817,053 | 6/1974 | Orth | 62/210 |
| 3,850,196 | 11/1974 | Fales | 137/554 |
| 4,176,688 | 12/1979 | Schwerin | 137/630.13 |
| 4,809,742 | 3/1989 | Grau | 137/554 |
| 4,995,586 | 2/1991 | Gensberger et al. | 251/129.04 X |
| 5,172,722 | 12/1992 | Nishimura | 137/599 |
| 5,197,508 | 3/1993 | Gottling | 251/129.04 X |

FOREIGN PATENT DOCUMENTS

| | | |
|---|---|---|
| 0006416 | 1/1979 | European Pat. Off. . |
| 0156962 | 11/1984 | European Pat. Off. . |

OTHER PUBLICATIONS

Thermostatische Expansionsventile; Acal Auriema.
"Evaporator Pressure Regulating Valves" Apr. 1995/Bulletin 90–20–1; pp. 1 and 2.
"Danfoss pilotgesteuerte modulierende Regler Qualität . Flexibilität Zuverlässigkeit"; PM Pilotgesteuerte Hauptventile; Refrigeration Controls.

*Primary Examiner*—Stephen M. Hepperle
*Attorney, Agent, or Firm*—Adams Law Firm, P.A.

[57] ABSTRACT

A valve apparatus for controlling a pressured fluid, in which the shut-off device is force closed by the pressured fluid which is admitted into a chamber via a throttle bore. The valve is opened via a drive means, which acts directly on both a pilot valve and on the shut-off device, without the interposition of an actuating fluid. The drive means first opens a pilot valve, thereby allowing the pressured fluid to escape from the chamber and to the outlet. The drive means then opens the shut-off device. The reduction in pressure in the chamber enables a drive means of only moderate power to complete the second step of opening the shut-off device. The drive means acts directly on the shut-off device; thus the control action corresponds directly to the stroke displacement of the drive means at any particular moment.

5 Claims, 3 Drawing Sheets

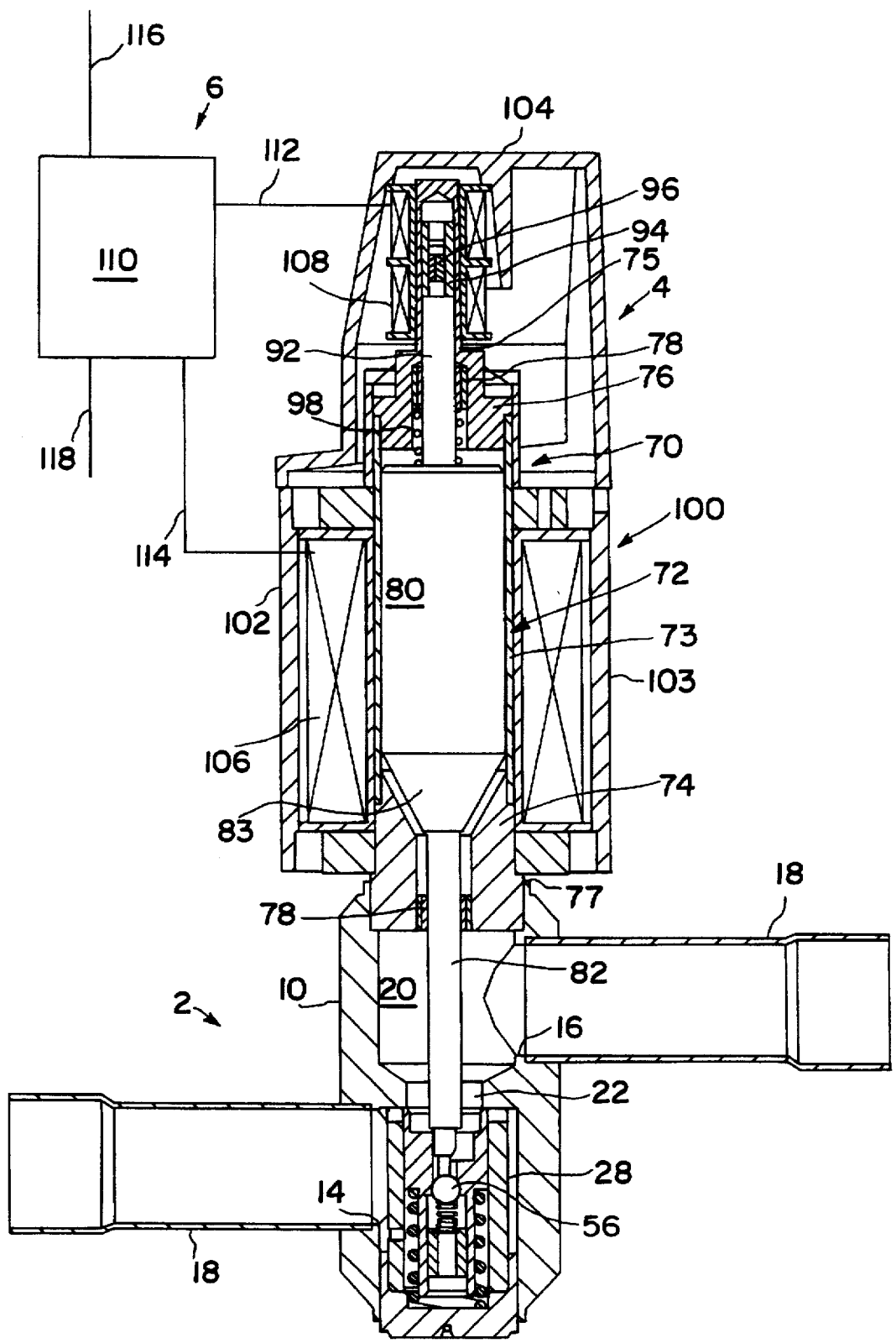
F I G. 1

CONTROL VALVE HAVING AN ACTUATING DRIVE AND METHOD THEREFOR

This application is a 1.62 file-wrapper continuation application of U.S. Ser. No. 08/346,691 filed Nov. 30, 1994 now abandoned.

BACKGROUND OF THE INVENTION

In a prior art control valve, a pressured fluid is employed to force a piston-type shut-off device into a closed position. To open the control valve, the pressure must first be released via a pilot valve. The pilot valve employs a shut-off element, in the form of a valve cone, attached directly to a tappet, which is rigidly joined to the armature of an electromagnetic actuating drive. The position of the shut-off element in the pilot valve determines the pressure in the piston chamber and, therefore, the position of the shut-off device. To reduce the flow of fluid through the control valve, the shut-off element must be moved, by displacing the armature, so as to reduce the flow of the fluid through the pilot valve. Pressure thus builds up on the piston of the shut-off device, countering the force of an opening spring and moving the piston in the closing direction.

If the prior art control valve is built into a circuit of a fluid, for example the refrigerant in a refrigerator, the extent of the control action can be determined only from the result that is obtained in the refrigeration circuit and that is subject to the prevailing pressure conditions.

SUMMARY OF THE INVENTION

The object of the invention is to provide a control valve that reacts directly to the action of the drive means and is capable of shutting off or sealing between high and low pressure, to perform the functions usually served by two separate valves.

In accordance with the invention, the drive means acts directly on both the pilot valve and on the shut-off device, without the interposition of an actuating fluid. As a result, the control action corresponds directly to the stroke displacement of the drive means at any particular moment. Furthermore, the closing force required for dependable closure can be obtained from the pressure of the fluid. Moreover, the pilot valve allows for pressure equalization on the shut-off piston so that the closing force does not have to be overcome by the drive means when opening the shut-off device. Advantageously, the drive element can be operated using an actuating drive of only modest power.

The pilot element is arranged in such a manner that, starting from the completely closed position of the control valve, the pilot valve is opened in a first part of the drive means' movement, and the shut-off device is opened in a second part of the movement following in the same direction.

The opening of the pilot valve allows pressure equalization to occur on both sides of the shut-off device. Thus, for the movement of said shut-off device from its closed position only a force of the order of the initial stress of the associated compression spring is needed. Consequently, it becomes possible to carry out the entire operation of the control valve with a relatively low driving force. The drive itself can thus be given relatively small dimensions, with consequent benefits in respect of both cost and space required.

In the closed position of the pilot valve, the shut-off device is necessarily also in the completely closed position. The pressure of the fluid builds up on the shutoff device and assists the action of the closing spring.

According to a preferred and particularly advantageous embodiment of the invention, the shut-off device is in the form of a slide, which contains the pilot valve and to which the passage element of the latter is rigidly joined, while the shut-off element of the pilot valve is movable relative to the slide.

Further objects, features, and advantages of the invention will become apparent from the following detailed description taken in conjunction with the accompanying figures showing a preferred embodiment of the invention.

BRIEF DESCRIPTION OF THE DRAWINGS

FIG. 1 shows a cross section of a control valve according to the invention.

DETAILED DESCRIPTION

Figure 2:
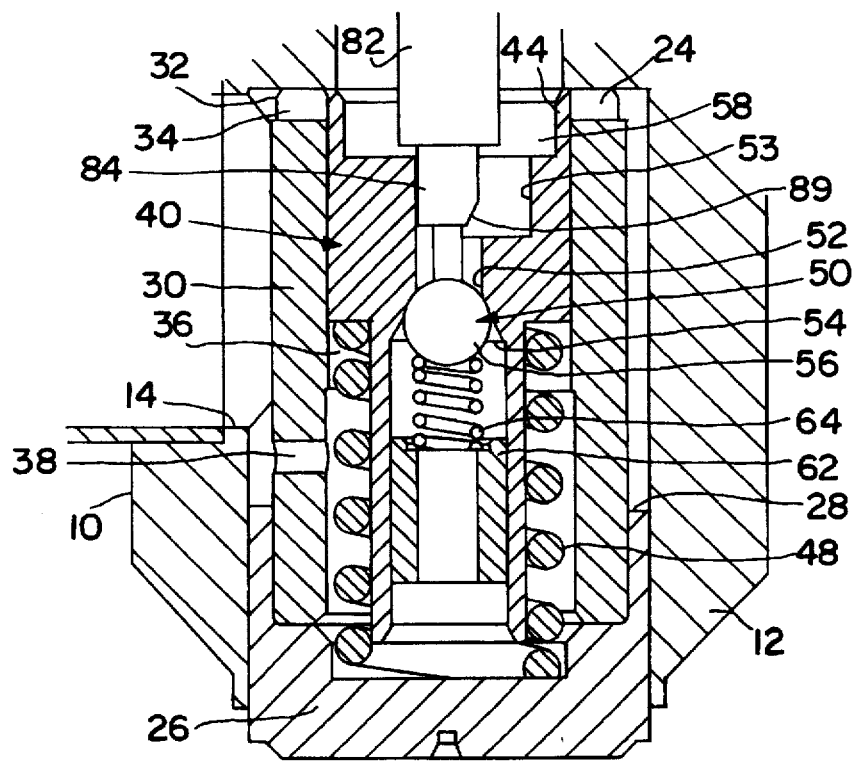
FIG. 2 shows on a larger scale a sectional representation of a valve part of FIG. 1, in the completely closed position.

FIG. 1 illustrates a control valve embodying the principles of the invention. The illustrated control valve includes a valve part 2, a drive part 4 arranged axially in line therewith, and a controller part 6. The valve part 2 comprises a substantially cylindrical valve casing 10, a radial inlet 14 formed by a bore, and a radial outlet 16 which is offset in the axial direction relative to the inlet and which is likewise formed by a bore. The inlet bore 14 leads into a cylindrical annular space 28 (FIG. 2), which is formed between the casing wall 12 and a bush 30 which likewise forms part of the valve casing. A cylindrical inner space 20 and a passage 22, which adjoins the latter and has a reduced cross-section, connects outlet bore 16 with the annular space 28. The passage 22 is reduced in diameter, relative to the annular space 28, by a casing shoulder 24. Respective connection lines 18 made of a copper alloy are inserted into the inlet bore 14 and into the outlet bore 16, and are fastened by soldering to the valve casing 10 made of stainless steel.

The cylindrically shaped bush 30 is centered in an end cap 26 belonging and welded to the valve casing 10, and is held pressed by its opposite end face 32 against the casing shoulder 24. Openings in the form of a plurality of radial grooves 34 distributed over the circumference start from the end face 32. The number and cross-section of these grooves 34 determine the nominal size of the passage of the control valve.

In its interior the bush 30 forms a piston chamber 36, in which a shut-off piston given the general designation 40 is provided. The shut-off piston has a shut-off device in the form of a sleeve-shaped slide 42 movable in the piston chamber. A prestressed compression spring 48, which is supported against the end cap 26, presses the throttle edge 44 of the slide 42 against the casing shoulder 24, which forms a valve seat. A pilot valve, which is arranged completely in the interior of the slide 42 and is given the general designation 50, is also associated with the shut-off piston 40. The pilot valve comprises a passage opening 52, surrounded by a conical seat 54, on the slide itself, and also a spherical shut-off element 56, which is for example made of a hard plastic material. Said shut-off element is arranged movably inside an interior space 46 in the slide 42. The interior space 46 is in communication, via the passage opening 52, with an interior space 58, which, at the end where the throttle edge 44 is situated, is in permanent communication via the passage 22 with the outlet 16. A closing spring 64, arranged in the interior space 46 and pressing the shut-off element 56 against the seat 54, is supported against an annular insert 62. The cylindrical passage opening 52 has an eccentric outward widening 53 which faces the interior space 58 and which will be further referred to below.

The piston chamber 36 and therefore also the interior space 46 are in communication with the annular space 28 via a throttle connection in the form of a throttle bore 38.

An explanation will now be given of the electro-magnetic drive part 4, which comprises a coil unit 100 and an armature unit 70, in the form of an independent subassembly, arranged therein. The armature unit 70 is bounded by an armature capsule 72 forming a casing, which together with the valve casing 10 is hermetically closed. The armature capsule 72 is composed of two guide bodies 74 and 76, which are connected by a connecting sleeve 73. The two guide bodies, made of tool steel, are rigidly joined by weld seams to the connecting sleeve 73, which is made of the same material. The guide body 74 is inserted into the valve casing 10 on the side facing the drive part 4 and is rigidly joined thereto at 77 by a so-called black-and-white weld. The armature capsule 72 assumes a coaxial position in relation to the valve casing 10.

Inside the armature capsule 72 is coaxially arranged a cylindrical armature 80, which is integral with a tappet 82 coaxial to it and with a coaxial armature extension 92. In this arrangement the armature 80 is guided for low-friction sliding on the tappet and on the armature extension in the armature capsule 72 by means of respective plain bearings 78 inserted into the guide bodies 74 and 76. A conical shoulder 83 on the armature 80 penetrates into the guide body 74, which acts as the core and which is in the form of a hollow cone. The tappet 82 extends through the valve casing 10 and ends in a pin 86 (FIG. 2). The inside diameter of the passage 52 is smaller than the diameter of the tappet 82. A part 84 of the tappet, where the diameter of the latter is reduced by a radial shoulder 88, extends through the part of the passage 52 where the outward widening 53 is provided, and has a flat 89 at the transition to the pin 86.

On the side remote from the valve part 2, the guide body 76 has a neck part 75 which has a reduced diameter and in which a free, sleeve-shaped end part 94 of the armature extension 92 extends. The end part 94 contains an armature insert 96, made for example of soft iron, which acts as a signal transmitter in a manner yet to be explained. Finally, the armature capsule 72 contains a compression spring 98 which surrounds the armature extension 92 and which extends between the guide body 76 and the armature 80 under slight initial stress. The compression spring 98 holds the tappet 82 continuously in a position in which the pin 86 lies against the shut-off element 56.

From the foregoing it is clear that the armature capsule 72 and the valve casing 10 together contain all moving parts of the control valve, including those for a designated displacement detection, and thus in a constructionally simple and reliable manner permit sealing for fluid conducted in this unit.

The coil unit 100 surrounding the armature unit 70 has a two-part casing 102 consisting of a bottom part 103 and a top part 104. The bottom part 103 contains an annular magnet coil 106, while in the top part 104 detachably connected to the bottom part 103 a displacement sensing coil 108 is disposed, which relative to the magnet coil 106 is coaxial but offset in the axial direction. The magnet coil 106 extends approximately in the axial region of the armature 80, while the displacement sensing coil 108 surrounds the armature insert 96, with which said coil forms a displacement sensor. The position of the parts is secured by the fastening (not illustrated) of the armature capsule 72 in the casing 102.

The controller part 6 is an electronic control unit 110 which comprises, constructed and connected in the usual manner, a comparator, a controller, and an amplifier (all not shown). An actual value input 112 is connected to the displacement sensing coil 108, while an output 114 is connected to the magnet coil 106. In addition, the control unit 110 has a desired value input 116 and a supply voltage connection 118.

The mode of action in the operation of the control valve will now be explained, it being assumed that said valve is installed in the refrigeration circuit of a cold steam compression refrigerating machine. It will be assumed that, with the control valve in the closed state, the refrigerant in the inlet bore 14 or in the annular space 28 will be under the liquefaction pressure (for example 20 bars), while a pressure which is for example 15 bars lower than that value prevails in the outlet bore 16 and in the interior space 20. When the control valve is in the closed state, the piston chamber 36, the interior space 46, and the annular space 28 have virtually the same pressure as the inlet bore 14. This pressure acts on the shut-off piston 40 in the same direction as the compression spring 48, the closing force corresponding to the full cross-sectional area of the piston chamber 36. Consequently, the slide 42 is pressed with its throttle edge 44 against the casing shoulder 24, and the shut-off element 56 is pressed against the seat 54. Thus, the control valve is able to master any differential pressure between the inlet 14 and the outlet 16.

A known controller 110, as used in refrigerating machine systems, can be used to operate the control valve. If an opening signal appears at the desired value input 116, a force initiated by the control unit 110 is produced at the armature 80. This force, which acts in the opening direction of the control valve produces a stroke at the tappet 82. This stroke acts against the forces which, as mentioned above, act on the shut-off element 56 in the closed state. By this stroke the shut-off element 56 is lifted off the seat 54 via the pin 86 and the passage 52 of the pilot valve 50 is opened.

Figure 3:
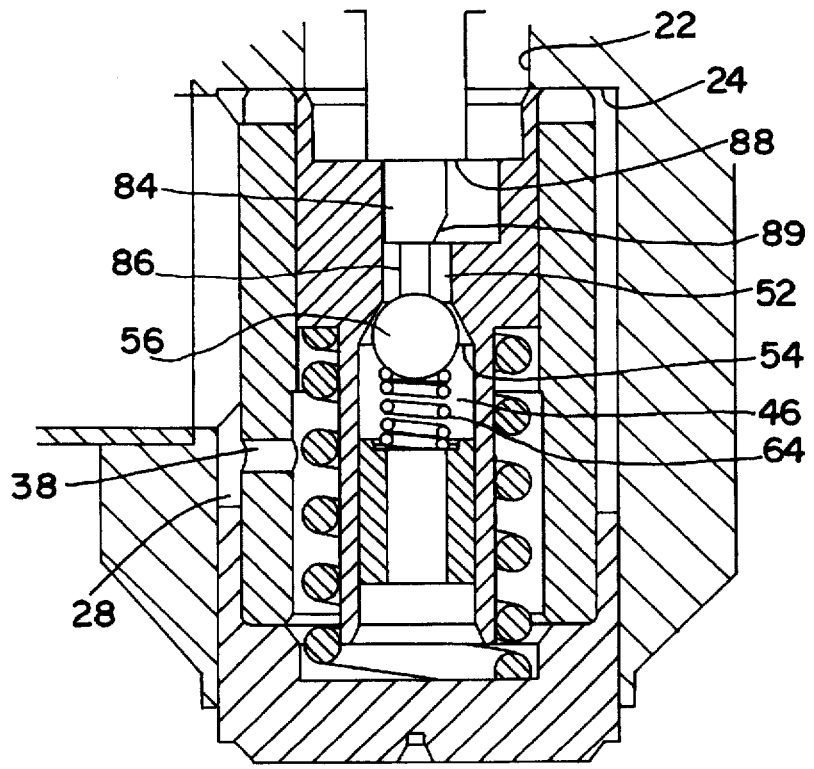
FIG. 3 shows the valve part of FIG. 2, with the pilot valve open.

From the position of the parts as illustrated in FIG. 3, it can be seen that in the first part of the movement made by the tappet 82 (i.e. as the pin 86 unseats the shut-off element 56) the slide 42 of the shut-off piston 40 remains closed. However, the closing pressure acting on the piston 40, (i.e. the differential pressure), declines quickly and extensively (until the pressure prevailing in the interior space 20 is reached) as the fluid from the piston chamber 36 flows through the passage 52 and the interior space 58 into the interior space 20 of the valve casing 10. The flat 89 on the tappet permits unhindered flow of the fluid from the passage 52 via the outward widening 53. The throttle bore 38 allows new pressure fluid to flow into the piston chamber 36 from the inlet 14 or the annular space 28; however, due to the size of the throttle bore 38, there is a considerable pressure drop. The throttle bore could of course be replaced with another kind of throttled connection between the spaces in question, for example through a clearance between the slide 42 and the bush 30.

The continuation of the stroke movement of the tappet 82 causes its shoulder 88 to act on the slide 42 in the opening direction. Because pressure equalization has occurred on the shut-off piston 40, the opening movement of the slide 42 is opposed only by the force of the initial stress of the compression spring 48. This force can be overcome by the magnet drive even when said drive is of modest dimensions, thereby moving slide 42 into an open position.

Figure 4:
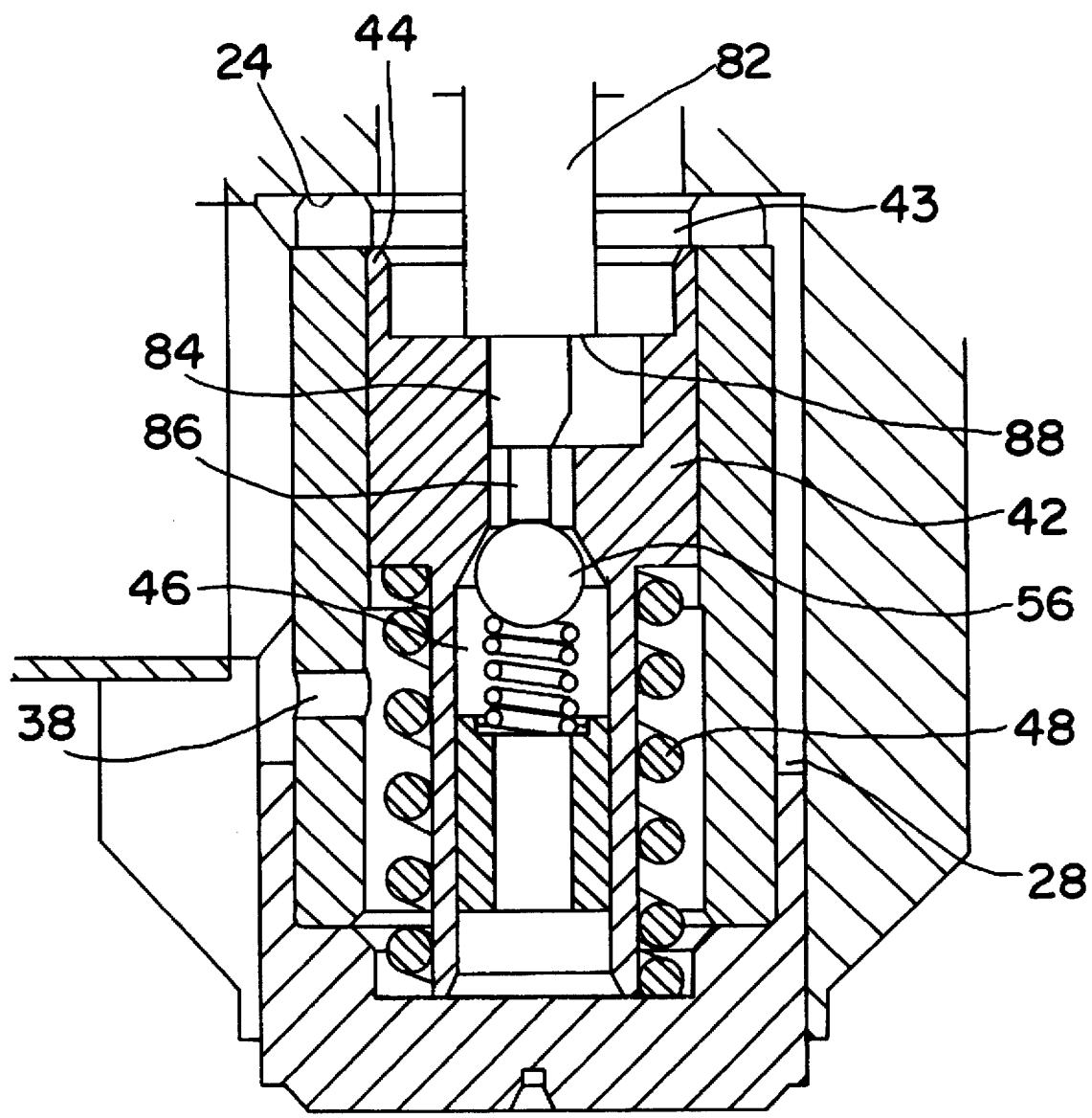
FIG. 4 shows the valve part of FIG. 2 with the shut-off device open.

Referring to FIG. 4, the annular gap 43 forming between the valve seat 24 and the throttle edge 44 allows fluid to flow in proportion to the width of said gap (i.e. its axial dimension) from the inlet bore 14 via the annular space 28 and the radial grooves 34 to the passage 22 and thus to the interior space 20 and the outlet bore 16. The maximum opening cross-section is dictated by the total cross-section of the radial grooves 34.

Because the slide 42 is forced by the compression spring 48 to bear against the tappet 82 or its shoulder 88, the position of the armature 80 corresponds to the position of the slide 42 and, thus, to the width of the annular gap 43. The effective stroke displacement of the armature is detected by the displacement sensor 108, 96 and fed to the control unit 110 via the actual value input 112 as a corresponding signal. Comparison with the desired value signal causes the control unit 110, in the event of deviations, to generate an electrically amplified correction signal and thus produces a corresponding correction stroke on the armature 80 via the output 114 and the magnet coil 106.

Because of the hollow cone configuration of the guide body 74 and the conical shoulder 83 of the armature 80, the field strength distribution over the displacement of the latter is controlled in a manner generally known per se.

The configuration of the valve casing 10 with a bush 30 to limit the piston chamber 36 makes it possible, by selection of a bush having a particular total cross-section of the radial grooves 34, to dictate the nominal size of the passage of the control valve, which in other respects remains unchanged. The manufacture and stock-keeping of parts of the control valve for different nominal sizes are accordingly simplified.

The displacement sensor 108, 94 supplies a signal both for the position of the pilot element and for that of the shut-off device, since the tappet cooperates with both of them. The direct cooperation of the unit comprising the armature extension 92, the armature 80 and the tappet 82 makes it possible to generate an accurate actual value signal.

The foregoing merely illustrates the principles of the invention. It will thus be appreciated that those skilled in the art will be able to devise numerous valve apparatuses which, although not explicitly shown or described herein, embody the principles of the invention and are thus within the spirit and scope of the invention.

For example, instead of a magnet drive for the control valve as disclosed, it is in principle also possible to use a different electrical drive having a linearly movable drive element. However, a magnet drive is suitable because it reacts sufficiently quickly for the control function and because of the need for only light force. In addition, with a magnet drive the sealing and bushing problems associated with the drive element can be definitely avoided by the enclosure in a capsule.

We claim:

1. A valve apparatus for controlling fluid flow, comprising:

(a) a valve, including a substantially cylindrical valve casing having an inlet port and an outlet port for fluid and a shut-off piston slidable within said valve casing;

(b) a cylindrical elongated armature capsule arranged in coaxial and in fluid-tight relation with said valve casing;

(c) an electromagnetic drive element having an annular magnet coil surrounding said armature capsule in coaxial relation thereto;

(d) an armature coaxially located on said magnet coils and axially slidable wig said armature capsule;

(e) a controller element having an annular sensing coil coaxially arranged on said armature capsule adjacent said magnet coil, and an armature insert coaxially located in said sensing coil and being axially displaceable within said capsule relative to said sensing coil, to generate a signal therein dependent on the relative axial position of said armature insert;

(f) a tappet slideably supported in said armature capsule and extending into said valve casing for cooperation with said shut-off piston, said magnet armature, said armature insert and said tappet being rigidly interconnected with each other, to slideably drive said shut-off piston via said drive element and to correspondingly displace said armature insert, whereby a signal for the position of said slidable shut-off piston is obtained by said controller element via a coaxial displacement of said armature insert with respect to the shut-off piston.

2. A valve apparatus according to claim 1, wherein said controller element is positioned on a side of said electromagnetic drive element opposite said valve.

3. A valve apparatus according to claim 1, wherein said shut-off piston includes:

(a) a main shut-off device for controlling fluid flow from said inlet to said outlet;

(b) and a pilot valve for said main shut-off device having a fluid passage and a shut-off element axially movable within said main shut-off device to control said fluid passage, and wherein said tappet being arranged to cooperate with said shut-off piston and with said pilot valve shut-off element to thereby obtain via said sensing coil of said controller element a signal indicative of both the positions of said main shut-off device and of said pilot valve shut-off element.

4. A valve apparatus according to claim 3, wherein said pilot valve includes a seat for receiving said shut-off element and spring means for maintaining said shut-off element in cooperation with said tappet when removed from said seat.

5. A valve apparatus according to claim 1, and including a casing for enclosing both said magnet coil and said sensing coil.

* * * * *